United States Patent [19]
Takemura et al.

[11] Patent Number: 4,680,752
[45] Date of Patent: Jul. 14, 1987

[54] TIME SWITCH IN A TIME DIVISION SWITCHING NETWORK

[75] Inventors: Tetsuo Takemura, Kamakura; Shinobu Gohara, Yokohama, both of Japan

[73] Assignee: Hitachi, Ltd., Tokyo, Japan

[21] Appl. No.: 613,392

[22] Filed: May 23, 1984

[30] Foreign Application Priority Data

May 24, 1983 [JP] Japan .................. 58-90030
May 24, 1983 [JP] Japan .................. 58-90031

[51] Int. Cl.⁴ .......................................... H04Q 11/04
[52] U.S. Cl. ........................... 370/63; 370/68; 370/84
[58] Field of Search ............... 370/68, 66, 63, 67, 370/84

[56] References Cited

U.S. PATENT DOCUMENTS 3,920,914 11/1975 Regnier et al. ................. 370/63
3,988,544 10/1976 Texier et al. ................... 370/68
4,298,977 11/1981 Abbott et al. .................. 370/68
4,455,646 6/1984 Bloodworth .................... 370/68
4,488,292 12/1984 Troost .......................... 370/68

OTHER PUBLICATIONS

"Time Division Switching Networks", A. Roche, Cnet, Lannion, France, pp. 421-1-1 to 421-1-7.

Primary Examiner—Douglas W. Olms
Attorney, Agent, or Firm—Antonelli, Terry & Wands

[57] ABSTRACT

A time switch for a time division switch has a function to exchange time slots as well as functions of bit are conversion and multiplexing or demultiplexing. A first stage time switch comprises a channel memory capable of sequential writing and random reading and a converter for converting a data read from the channel memory to a universal signal in accordance with a conversion mode designation. A final stage time switch comprises a channel memory capable of random writing and sequential reading and a control circuit for designating a write bit position of the channel memory in accordance with a write mode designation. An economic time switch having a high flexibility to a traffic variation among bearer signals is provided.

17 Claims, 13 Drawing Figures

| BIT RATE (Kb/S) | CONVERSION MODE | | | | | X | | | | | | | | Y | | | | | | | |
|---|---|---|---|---|---|---|---|---|---|---|---|---|---|---|---|---|---|---|---|---|---|
| | I5 | I6 | I7 | I8 | I9 | 8 | 7 | 6 | 5 | 4 | 3 | 2 | 1 | 8 | 7 | 6 | 5 | 4 | 3 | 2 | 1 |
| 64 | 1 | 1 | X | X | X | | | | | | | | | h | g | f | e | d | c | b | a |
| 32 | 1 | 0 | X | X | 0 | | | | | | | | | g | g | e | e | c | c | a | a |
| | 1 | 0 | X | X | 1 | | | | | | | | | h | h | f | f | d | d | b | b |
| 16 | 0 | 1 | X | 0 | 0 | h | g | f | e | d | c | b | a | e | e | e | e | a | a | a | a |
| | 0 | 1 | X | 0 | 1 | | | | | | | | | f | f | f | f | b | b | b | b |
| | 0 | 1 | X | 1 | 0 | | | | | | | | | g | g | g | g | c | c | c | c |
| | 0 | 1 | X | 1 | 1 | | | | | | | | | h | h | h | h | d | d | d | d |
| 8 | 0 | 0 | 0 | 0 | 0 | | | | | | | | | a | a | a | a | a | a | a | a |
| | 0 | 0 | 0 | 0 | 1 | | | | | | | | | b | b | b | b | b | b | b | b |
| | 0 | 0 | 0 | 1 | 0 | | | | | | | | | c | c | c | c | c | c | c | c |
| | 0 | 0 | 0 | 1 | 1 | | | | | | | | | d | d | d | d | d | d | d | d |
| | 0 | 0 | 1 | 0 | 0 | | | | | | | | | e | e | e | e | e | e | e | e |
| | 0 | 0 | 1 | 0 | 1 | | | | | | | | | f | f | f | f | f | f | f | f |
| | 0 | 0 | 1 | 1 | 0 | | | | | | | | | g | g | g | g | g | g | g | g |
| | 0 | 0 | 1 | 1 | 1 | | | | | | | | | h | h | h | h | h | h | h | h |

FIG. 12

| BIT RATE (Kb/S) | WRITE MODE | | | | | ENABLE TERMINAL (SIGNAL) | | | | | | | |
|---|---|---|---|---|---|---|---|---|---|---|---|---|---|
| | C1 | C2 | C3 | C4 | C5 | G8 | G7 | G6 | G5 | G4 | G3 | G2 | G1 |
| 64 | 1 | 1 | X | X | X | 1 | 1 | 1 | 1 | 1 | 1 | 1 | 1 |
| 32 | 1 | 0 | X | X | 0 | 0 | 1 | 0 | 1 | 0 | 1 | 0 | 1 |
| | 1 | 0 | X | X | 1 | 1 | 0 | 1 | 0 | 1 | 0 | 1 | 0 |
| 16 | 0 | 1 | X | 0 | 0 | 0 | 0 | 0 | 1 | 0 | 0 | 0 | 1 |
| | 0 | 1 | X | 0 | 1 | 0 | 0 | 1 | 0 | 0 | 0 | 1 | 0 |
| | 0 | 1 | X | 1 | 0 | 0 | 1 | 0 | 0 | 0 | 1 | 0 | 0 |
| | 0 | 1 | X | 1 | 1 | 1 | 0 | 0 | 0 | 1 | 0 | 0 | 0 |
| 8 | 0 | 0 | 0 | 0 | 0 | 0 | 0 | 0 | 0 | 0 | 0 | 0 | 1 |
| | 0 | 0 | 0 | 0 | 1 | 0 | 0 | 0 | 0 | 0 | 0 | 1 | 0 |
| | 0 | 0 | 0 | 1 | 0 | 0 | 0 | 0 | 0 | 0 | 1 | 0 | 0 |
| | 0 | 0 | 0 | 1 | 1 | 0 | 0 | 0 | 0 | 1 | 0 | 0 | 0 |
| | 0 | 0 | 1 | 0 | 0 | 0 | 0 | 0 | 1 | 0 | 0 | 0 | 0 |
| | 0 | 0 | 1 | 0 | 1 | 0 | 0 | 1 | 0 | 0 | 0 | 0 | 0 |
| | 0 | 0 | 1 | 1 | 0 | 0 | 1 | 0 | 0 | 0 | 0 | 0 | 0 |
| | 0 | 0 | 1 | 1 | 1 | 1 | 0 | 0 | 0 | 0 | 0 | 0 | 0 |

TIME SWITCH IN A TIME DIVISION SWITCHING NETWORK

The present invention relates to a time switch such as used in a time division switching network, which performs a bit rate conversion and multiplexing or multi-separation.

In a present day digital telephone network, a speech signal is exchanged and is transmitted as a 64 Kb/s digital signal having a period of 125 μs and data of 8 bits/period Accordingly, a time division switching network for the digital telephone network is usually designed to perform an exchange at a rate of 64 Kb/s.

On the other hand, in order to economically cope with a service for a facsimile communication or a data communication which is operated at lower than 64 Kb/s, a multi-digital network operated at a multi-bandwidth of 8 Kb/s×N (N=1, 2, 4, 8) has been desired.

FIG. 1 shows a configuration of a channel of a prior art time division switching network for the multi-bandwidth digital network.

Numeral 1 denotes a time division switch of T (time switch)×S (space switch)×T (time switch) configuration, numeral 2 denotes a bearer-universal multiplex converter for converting a bearer multiplex signal from a transmission line 101 (signal multiplexed at a bearer speed inherent to a terminal) to a universal signal (basic speed signal for the time division switching derived by speed-converting the bearer signal, e.g. 64 Kb/s signal), and numeral 3 denotes a universal-bearer multiplex converter for converting the universal signal to a bearer multiplex signal to send it out to a transmission line 104.

On the transmission path 101, 8/N channels of 8 Kb/s×N (N=1, 2, 4) signals are multiplexed to one time slot of 64 Kb/s. (As a matter of course, the bearer multiplexing does not occur at the bearer speed of 64 Kb/s (N=8)). The bearer-universal multiplex converter 2 converts the inputs thereto to N universal signals (64 Kb/s) and sends them out to an internal highway 102.

The universal signals are switched in the time division switch 1 at 64 Kb/s and then supplied to the universal-bearer multiplex converter 3 through an internal highway 103 and re-converted to the bearer multiplex signals and sent out to the transmission line 104.

The multiplex converters 2 and 3 are now explained in detail.

FIG. 2 is a block diagram of one example of the bearer-universal multiplex converter.

Numeral 21 denotes a demultiplexer, numerals 22, 23 and 24 denote converters for converting the 8 Kb/s×8 bearer multiplex signals to the universal signals (64 Kb/s)×8, the 16 Kb/s×4 bearer multiplex signals to the universal signals×4, and the 32 Kb/s×2 bearer multiplex signals to the universal signals×2, respectively, and numeral 25 denotes a multiplexer.

The transmission line 101 comprises a time slot #1 which is bearer-multiplexed at 8 Kb/s×8, a time slot #2 which is bearer-multiplexed at 16 Kb/s×4, a time slot #3 of 32 Kb/s×2 and a time slot #4 for a signal of the bearer speed of 64 Kb/s.

The demultiplexer 21 separates the signals to the time slots #1 to #4 and outputs them to lines 26, 27, 28 and 29.

The converters 22, 23 and 24 are provided for the bearer speeds of 8 Kb/s, 16 Kb/s and 32 Kb/s, respectively, and separate the bearer multiplex signals and convert the bearer speed to the universal signal (64 Kb/s) and send them out to lines 26A, 27A and 28A.

The universal signals are then multiplexed by the multiplexer 25 and sent out to the internal highway 102. The signal at the bearer speed of 64 Kb/s need not be speed-converted and it is directly supplied to the multiplexer 25 from the separator 21.

FIG. 3 is a block diagram of one example of the universal-bearer multiplex converter.

Numeral 31 denotes a demultiplexer, numerals 32, 33 and 34 denote converters for converting the universal signals×8 to the 8 Kb/s×8 bearer multiplex signals, the universal signal×4 to the 16 Kb/s×4 bearer multiplex signals and the universal signals×2 to the 32 Kb/s×2 bearer multiplex signals, respectively, and numeral 35 denotes a multiplexer.

The internal highway 103 comprises universal signal time slots #1 to #8 for signals of the bearer speed of 8 Kb/s, universal signal time slots #9 to #12 for signals of the bearer speed of 16 Kb/s, universal signal time slots #13 and #14 for signals of the bearer speed of 32 Kb/s and a time slot #15 for the signal of the bearer speed of 64 Kb/s.

The demultiplexer 31 separates the signals to the time slots #1 to #15 and sends out the signals of the time slots #1 to #8 to lines 36, the signals of the time slots #9 to #12 to lines 37, the signals of the time slots #13 and #14 to lines 38, and the signal of the time slot #15 to a line 39.

The converters 32, 33 and 34 are provided for the bearer speeds of 8 Kb/s, 16 Kb/s and 32 Kb/s, respectively, and bit rate-convert the universal signals to the bearer signals and bearer-multiplex the signals at 64 Kb/s.

The 64 Kb/s bearer multiplex signals are then sent out to lines 36A, 37A and 38A and they are multiplexed with the 64 Kb/s signal on the line 39 by the multiplexer 35 and sent out to the transmission line 104.

In the prior art network, the multiplex converters 2 and 3 which are fairly complex and are required before and after the time division switch 1. Accordingly, the network is not economical and cannot flexibly cope with a traffic variation among the bearer speeds because the time slot is fixedly allotted to each bearer rate signal.

This is due to the fact that the time division switch 1 is of T×S×T configuration and designed to switch only at the basic speed of 64 Kb/s, and the time switch T has only a time slot exchange function at 64 Kb/s and has no function of the bit rate conversion between the bearer signal and the universal signal and no function of bearer multiplexing and bearer separation.

It is an object of the present invention to provide an economical time switch which does not need a special unit for a speed conversion between a bearer signal and a universal signal and bearer multiplexing.

It is another object of the present invention to provide a time switch having a flexibility to a traffic variation of bearer signals.

It is still another object of the present invention to provide a time division switch which is simple in construction and easy to control.

The time switch of the present invention comprises a speech path memory or channel memory which writes data from an incoming highway by designating a fixed address for a time slot and reads out the data by designating a variable address for a time slot of an outgoing highway, a converter for converting the read data to a universal signal in accordance with a conversion mode designation, and a control memory for storing the variable address designation to the channel memory and the conversion mode designation to the converter in a synchronized mode.

In summary, the channel memory is sequentially written and randomly read to allow multi-distribution to a plurality of time slots, and the multi-distributed signals are converted to the universal signals for each time slot by the converter.

By using the time switch as a first stage switch of the switching network, the bearer-universal multiplex converter 2 in the prior art system is eliminated and the system is significantly more economical.

The time switch of the present invention also comprises a speech path memory or channel memory which writes data from an incoming highway at a designated bit position by designating a variable address for a time slot and reads out the data by designating a fixed address for a time slot of an outgoing highway, a write control circuit for designating a write bits position of the speech path memory in accordance with a write mode designation, and a control memory for storing the variable address designation to the speech path memory and the write mode designation to the write control circuit.

In summary, the speech path memory is randomly written and sequentially read and the writing is variably controlled bit by bit to convert the universal signals to the bearer multiplex signals.

Accordingly, by using the time switch as a final stage of the switching network, the universal-bearer multiplex converter 3 of the prior art system is eliminated and the system is significantly more economical.

The present invention will be apparent from the following detailed description taken in conjunction with the accompanying drawings, in which:

FIG. 12 shows a truth table for write control in FIG. 9; and

Embodiments of a T-S-T time division switch of the present invention are explained with reference to the drawings.

An embodiment of a first stage time switch of the present invention is first explained with reference to FIGS. 4 and 5 which show a connection diagram and a signal flow diagram.

Figure 1:
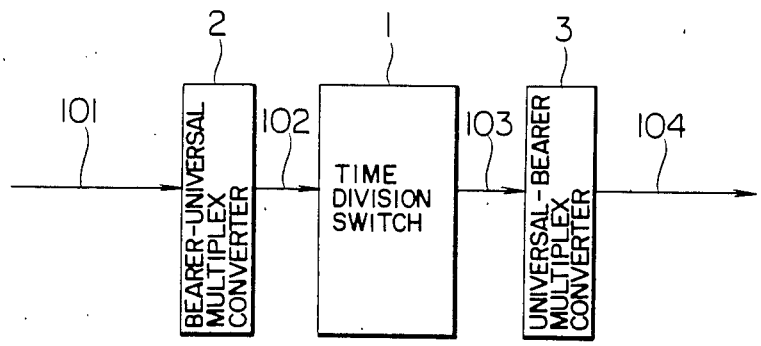
FIG. 1 shows a configuration of a channel of a time division switching network for a multi-bandwidth digital network.
Figure 2:
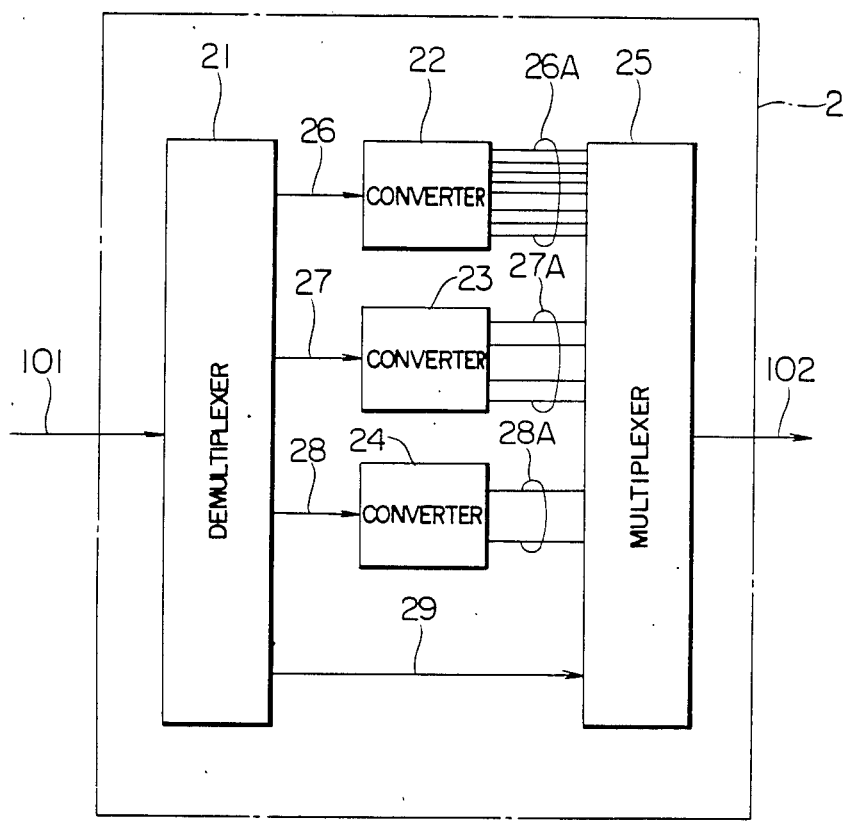
FIG. 2 is a block diagram of a bearer-universal multi-converter in FIG. 1.
Figure 3:
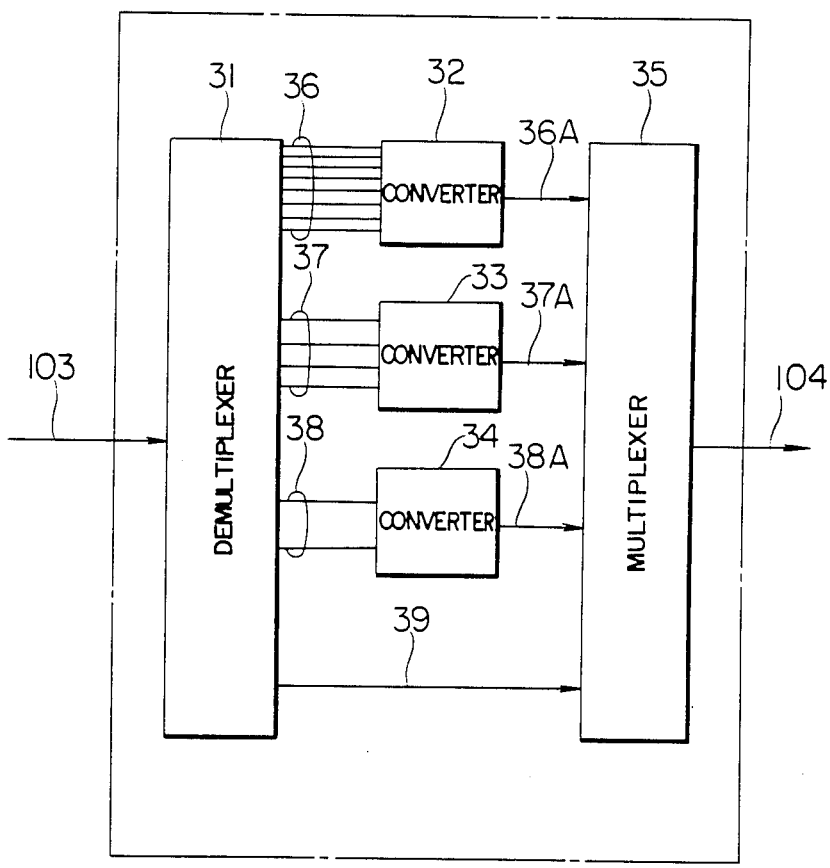
FIG. 3 is a block diagram of a universal-bearer multi-converter in FIG. 1.
Figure 4:
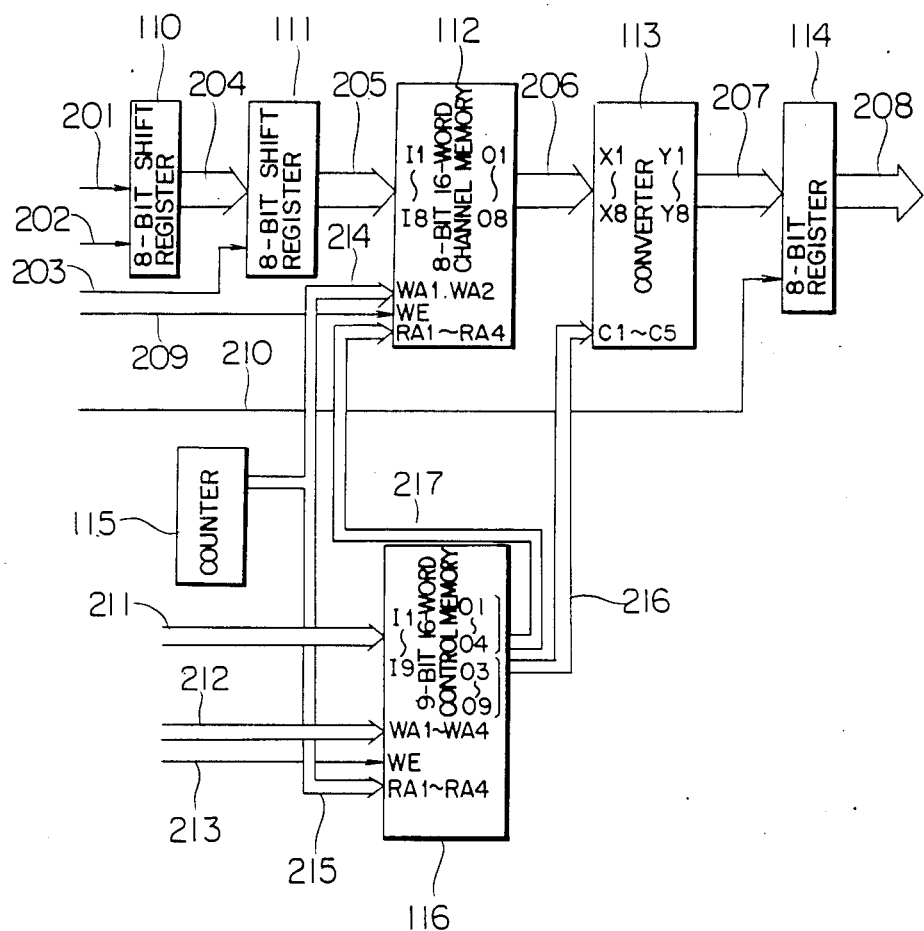
FIG. 4 is a block diagram of one embodiment of a first stage time switch of the present invention.
Figure 5:
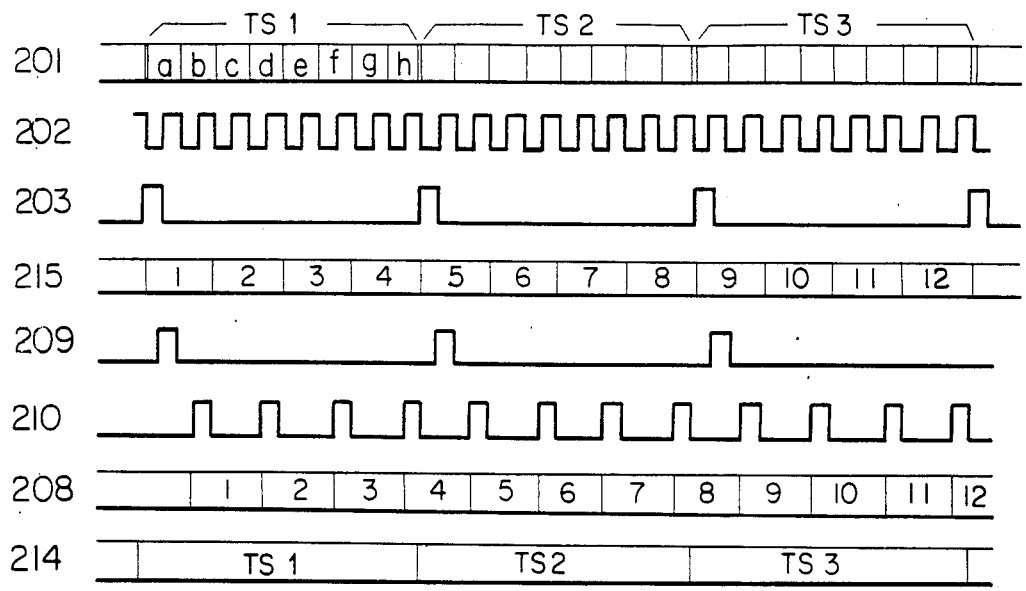
FIG. 5 is a timing chart for FIG. 4.

In FIG. 4, numeral 110 denotes an 8-bit shift register, numeral 111 denotes an 8-bit shift register, numeral 112 denotes an 8-bit 16-word speech path memory, numeral 113 denotes a converter, numeral 114 denotes an 8-bit register, numeral 115 denotes a counter and numeral 116 denotes a 9-bit 16-word control memory. Waveforms shown in FIG. 5 are designated by the same numerals as the line numbers of FIG. 4.

An incoming highway 201 is a 256 Kb/s highway to which four time slots TS0–TS3 each consisting of 8 bits are multiplexed at a 8 kHz period. Data on the incoming highway 201 is stored in the shift register 110 by a clock 202, and after one time slot shift, is parallelly loaded into the register 111 by a clock 203. The content of the register 111 is written into the speech path memory 112 by a clock 209 in accordance with an address 0–3 specified by the counter 115. The time slots TS0–TS3 correspond to the addresses 0–3, respectively. (Fixed address designation.)

On the other hand, the speech path memory 112 is read out in accordance with the content of the control memory 116. A read address 215 of the control memory 116 corresponds to the time slot number to be connected to an outgoing-highway 208 (variable address designation) and the control memory 116 contains the time slot numbers of the incoming highway 201 and conversion modes of the converter 113.

The data of the incoming highway 201 written into the channel memory 112 is read out in accordance with a time slot designation 217 of the incoming highway 201 read out of the control memory 116. This data is converted to a universal signal in the converter 113 by a conversion mode designation 216 read out of the control memory 116 and the universal signal is loaded into the register 114 by a clock 210 and outputted to the outgoing highway 208.

Let us assume that two data A and B having a bearer rate of 32 Kb/s are multiplexed on the time slot TS1 of the incoming highway 201 and they are separated to the time slots TS6 and TS7 of the outgoing highway 208 to convert them to the universal signals. The time switch operates in the following manner.

The operation comprises the switching of the data A on the time slot TS1 of the incoming highway 201 to the time slot TS6 of the outgoing highway 208 to convert it to the universal signal and the switching of the data B on the time slot TS1 of the incoming highway 201 to the time slot TS7 of the outgoing highway 208 to convert it to the universal signal.

Figure 6:
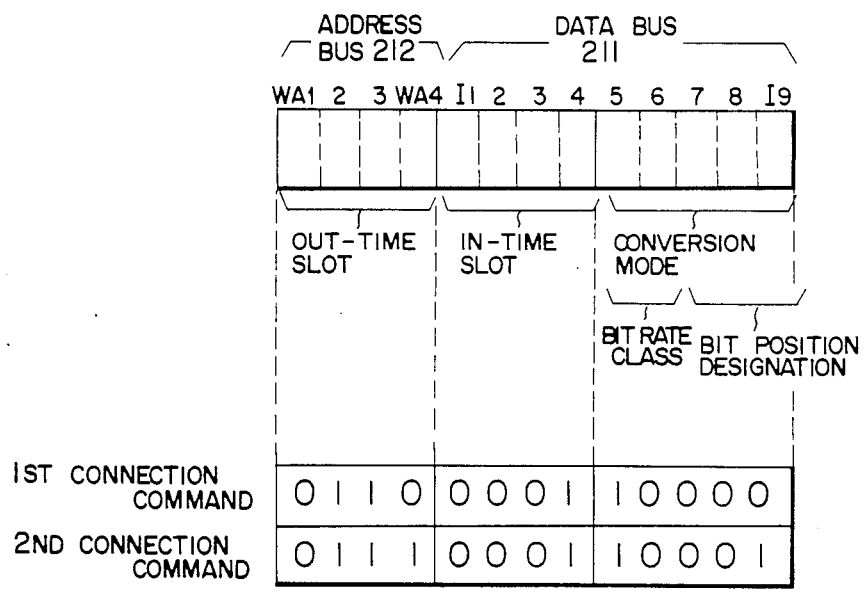
FIG. 6 shows a format of a connection command in FIG. 4.
Figures 7, 8:
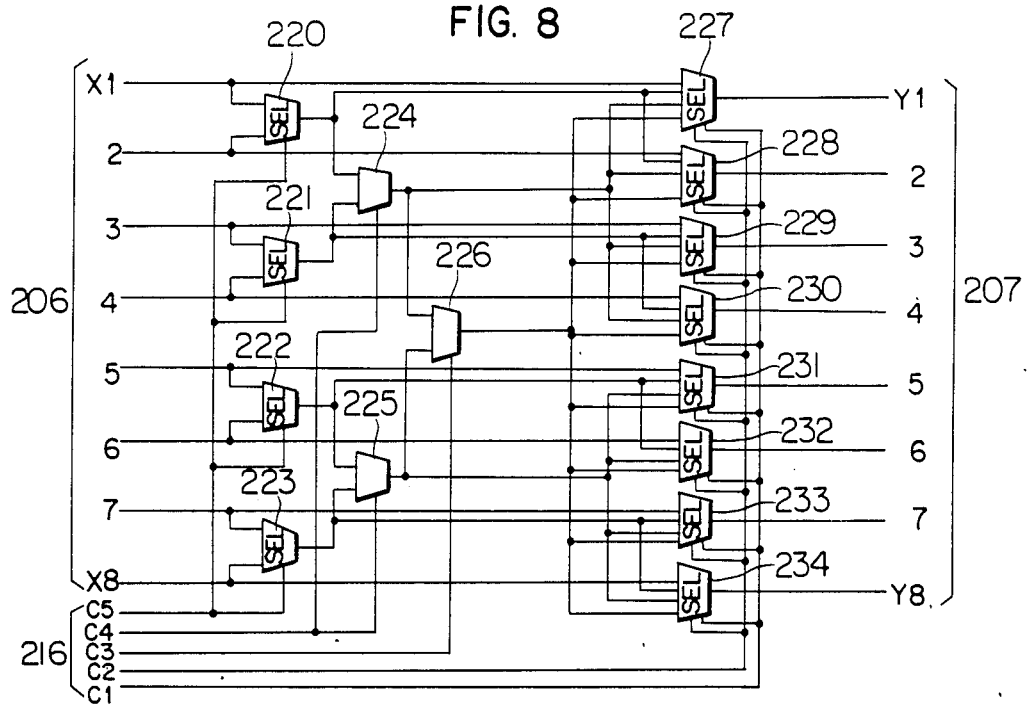
FIG. 7 shows a truth table for the conversion in FIG. 4.
FIG. 8 is a block diagram of one embodiment of a converter of FIG. 4.

FIG. 6 shows a format of a connection command supplied to the control memory 116. FIG. 7 shows a conversion truth table which shows a relation between a conversion mode coding and a truth value of the converter 13. The converter 113 produces outputs $Y_1$-$Y_1$ for inputs $X_1$-$X_8$ in accordance with the conversion mode designated by bits $I_5$-$I_9$. FIG. 8 shows a block diagram of the converter 113 which converts the signal in accordance with the truth value. Numerals 220–226 denote 2-input 1-output selectors and numerals 227–234 denote 4-input 1-output selectors. They select the signals in accordance with control inputs $C_1$-$C_5$.

The operations at the bearer rates other than that described above will be readily understood from FIGS. 6 and 7 and hence they are not explained.

A control unit not shown, of the switching network designates out-time slots (WA1–WA4), in-time slots ($I_1$–$I_4$) and conversion modes ($I_5$–$I_9$) (bit rate class and bit position designation) (see FIG. 6) by an address bus 212 and a data bus 211 and writes the connection command into the control memory 116 by a write signal to a clock line 213. The data "000110000" is written at an address "0110" of the control memory 116 by the first connection command, and the data "000110001" is written at an address "0111" by the second connection command.

Thus, the content "000110000" of the control memory 116 at the address "0110" is read out at a timing corresponding to the time slot TS6 of the outgoing highway 208. As a result, as shown in FIG. 4, the high order four bits $O_1$–$O_4$ (0001) corresponding to the in-time slot are supplied to read addresses RA1–RA4 of the channel memory 112 through a line 217, and low order five bits $O_5$–$O_9$ (10000) corresponding to the conversion mode are supplied to control signals $C_1$–$C_5$ of the converter 113 through a line 216.

The high order two bits $O_5O_6$ (10) of the conversion mode designation data correspond to the bearer rate of 32 Kb/s, and "00" correspond to the bit rate class of 8 Kb/s, "01" to the bit rate class of 16 Kb/s and "11" to the bit rate class of 64 Kb/s.

When the data "a, b, c, d, e, f, g, h" in the time slot TS1 of the incoming highway 201 is read out from the channel memory 112 by the in-time slot designation data "0001" and supplied to the inputs $X_1$–$X_8$ of the converter 113 through the line 206, the data "aa cc ee gg" is produced from the outputs $Y_1$–$Y_8$ in accordance with the conversion bit position designation ($I_9$="0") and is loaded into the register 114 by the clock 210.

Thus, the data at 32 Kb/s corresponding to even numbered bits in the time slot TS1 of the incoming highway 201 is outputted to the time slot TS6 of the outgoing highway 208 as the universal signal at 64 Kb/s. Similarly, the data at 32 Kb/s corresponding to the odd numbered bits on the time slot TS1 of the incoming highway 201 is outputted to the time slot TS7 of the outgoing highway 208 as the universal signal at 64 Kb/s.

In the present embodiment, the multiplexity of the incoming highway 201 (m) is four and the multiplexity of the outgoing highway 208 (n) is 16 and hence m<n The connection function is attainable with m=n or m>n within an allowable range of block factor.

As seen from the above embodiment, the initial stage time switch of the present invention can handle the signals of a multiple of bearer rates by merely expanding the bit width of the memory and adding the code converter to the prior art time switch. Accordingly, the time division switch is significantly more economical. Further, since the traffic quantity to be handled depends only on the total traffic and does not depend on the traffic ratio of the individual bearer rate signals, a high flexibility to the traffic variation among the individual bearer rate signals is attained.

An embodiment of the final stage time switch of the present invention is now explained with reference to FIGS. 9 and 10 which show a configuration of the switch and a signal flow diagram.

Figure 9:
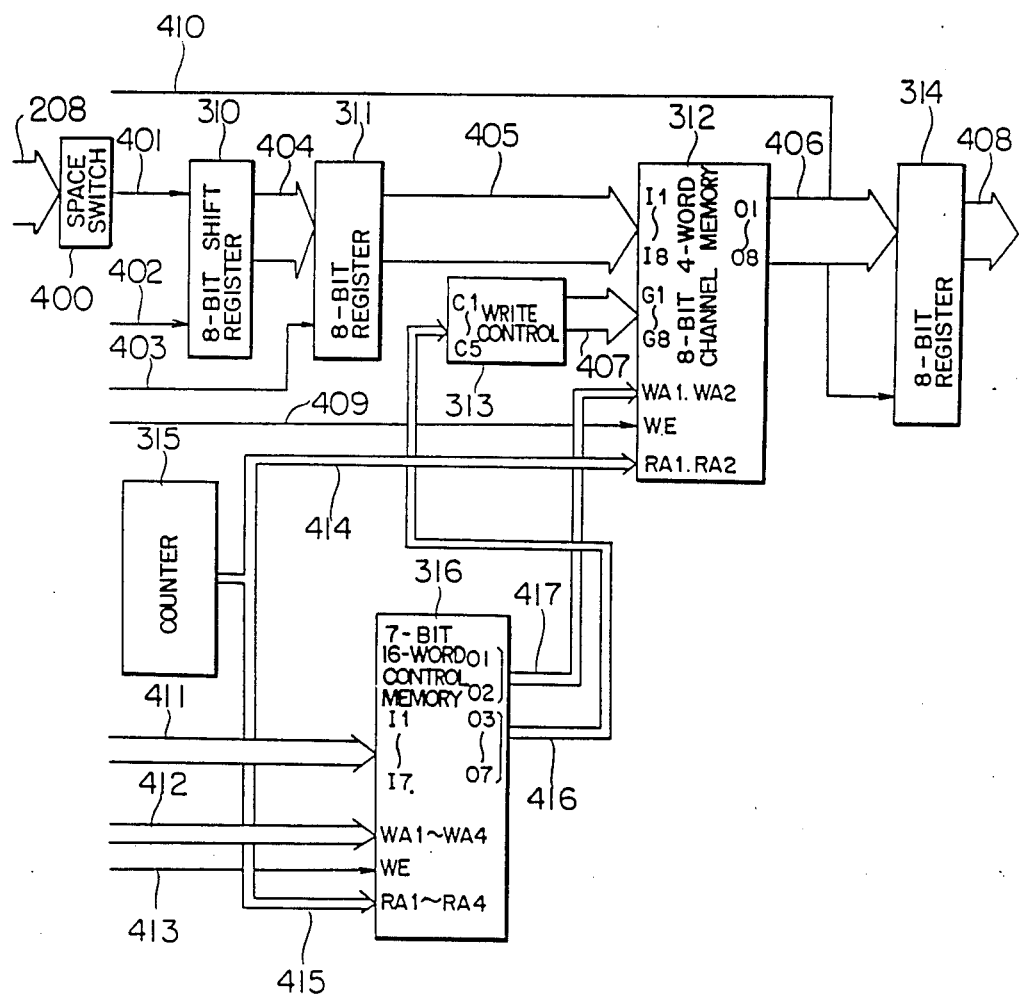
FIG. 9 is a block diagram of one embodiment of a final stage time, switch of the present invention.

In FIG. 9, numeral 310 denotes an 8-bit shift register, numeral 311 denotes an 8-bit register, numeral 312 denotes an 8-bit 4-word channel memory, numeral 313 denotes a write control circuit, numeral 314 denotes an 8-bit register, numeral 315 denotes a counter and numeral 316 denotes a 7-bit 16-word control memory.

Figure 10:
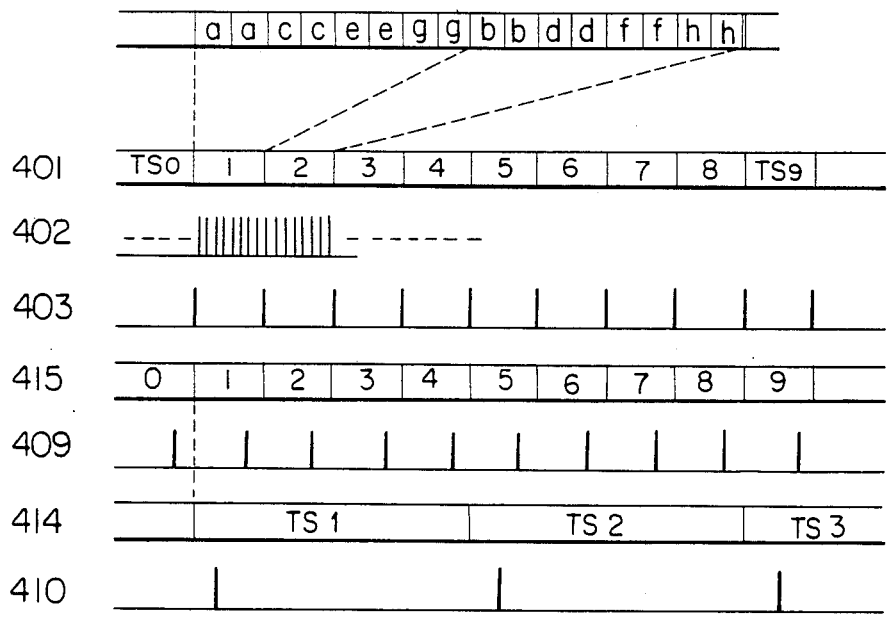
FIG. 10 is a timing chart for FIG. 9.

Waveforms in FIG. 10 are designated by the same numerals as the line numbers in FIG. 9.

An incoming highway 401 is a 1024 Kb/s highway on which 16 time slots TS0–TS15 each consisting of 8 bits are multiplexed at a 8 kHz period, and it is connected to the outgoing highway 208 of FIG. 4 through a space switch 400. The data on the incoming highway 401 is stored in the shift register 310 by a clock 402, and the content of the shift register 310 is shifted by one time slot and then parallelly loaded into the register 311 by a clock 403.

The control memory 316 contains write addresses to the channel memory 312 and write modes for designating write bit positions and bit rate classes, for the data on the incoming highway 401 loaded into the register 311, for each time slot of the incoming highway 401.

The counter 315 sends out a count representing the time slot number of the incoming highway 401 to an address line 415 to determine the read address of the control memory 316.

The read data designates the write address of the channel memory 312 through a line 417. (Variable address designation.) The other read data is supplied to the write control circuit 313 through a line 416 so that the write control circuit 313 produces a write bit designation 407. Of the data on the incoming highway 401, only those bits which are designated by the line 407 are written into the address of the channel memory 312 designated by the line 417.

On the other hand, the channel memory 312 is sequentially read out in accordance with an output 414 of the counter 315 (fixed address designation), and the read data is loaded into the register 314 at a timing of a clock 410.

Let us assume that signals having bearer rate of 32 Kb/s and converted to 64 Kb/s universal signals are allotted to the time slots TS1 and TS2 of the incoming highway 401 and those signals are multiplexed to the time slot TS3 of the outgoing highway 408. The operation of the present time switch is now explained in detail. The operations for other cases can be readily understood from FIGS. 11 and 12.

Figure 11:
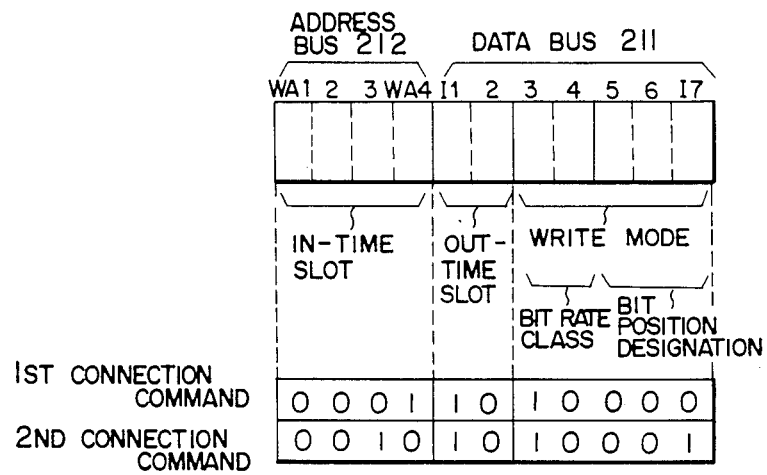
FIG. 11 shows a format of a connection command in FIG. 9.

FIG. 11 shows a format of a connection command sent to the control memory 316. FIG. 12 shows a truth table of the write control circuit 313 which shows the relation between the bit rate class, and the write mode and the enable signal. A symbol X in FIG. 12 indicates that either "1" or "0" is allowed.

A control unit, not shown, of the switching method designates in-time slots (WA1–WA4), out-time slots ($I_1$, $I_2$) and write modes ($I_3$–$I_7$) (bit rate class and bit position designation) by the address bus 412 and the data bus 411 (FIG. 11), and writes the connection command into the control memory 316 by the write signal to the clock line 413. The data "1010000" is written at the address "0001" of the control memory 316 by the first connection command, and the data "1010001" is written at the address "0010" by the second connection command.

Thus, the data "1010000" at the address "0001" of the control memory 316 is read out at a timing corresponding to the time slot TS1 of the incoming highway 401. As a result, as shown in FIG. 9, the high order two bits $O_1$, $O_2$ (10) corresponding to the out-time slot are supplied to the write addresses WA1, WA2 of the channel memory 312 through the line 417.

The high order two bits $O_3$, $O_4$ (10) of the write mode designation data correspond to the bearer rate class of 32 Kb/s, and "00" corresponds to the bit rate class of 8

Kb/s, "01" to the bit rate class of 16 Kb/s and "11" to the bit rate class of 64 Kb/s.

The low order five bits $O_3$–$O_7$ (10000) corresponding to the write mode are supplied to control inputs $C_1$–$C_5$ of the write control circuit 313.

The write control circuit 313 produces "1's" at enable terminals G1, G3, G5 and G7 of the channel memory 312, and "0's" at enable terminals G2, G4, G6 and G8, in accordance with the truth table of FIG. 12.

As shown in FIG. 10, the data "aa cc ee gg" on the time slot TS1 of the incoming highway 401 is supplied to the inputs $I_1$–$I_8$ of the channel memory 312 by the time slot designation data "0001", and only those bits whose enable signals G1–G8 are "1", that is, only the odd numbered bits "a c e g" are written at the address 2.

Similarly, the even numbered bit data "b d f h" in the data "bb dd ff hh" on the time slot TS2 of the incoming highway 401 is written at the address 2 of the channel memory 312 in accordance with the second connection command.

As a result, the data "a b c d e f g h" which was derived by bearer-multiplexing the 32 Kb/s data on the time slots TS1 and TS2 is written at the address 2 of the channel memory 312.

The data at the address 2 of the channel memory 312 is read out at a timing corresponding to the time slot TS2 of the outgoing highway 408.

In the present embodiment, the channel memory 312 has a gate function (enable terminals G1–G8) which allows selective writing bit by bit, but the same function may be attained with a memory having no such function.

Figure 13:
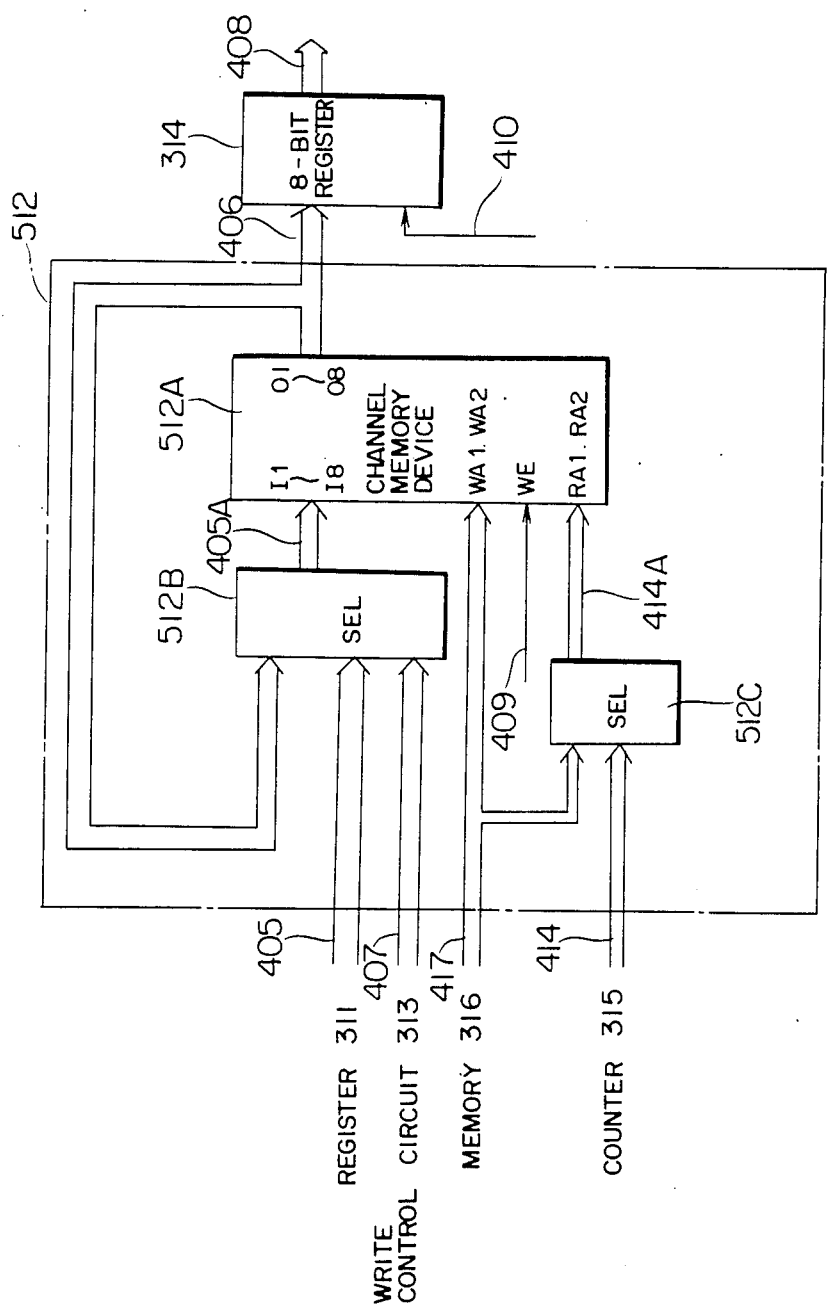
FIG. 13 is a block diagram of a speech path memory in another embodiment of the final stage time switch of the present invention.

FIG. 13 is a block diagram of the channel memory in other various embodiment of the final stage time switch of the present invention. It may substitute for the channel memory 312 of FIG. 9.

Numeral 512 denotes the channel memory, numeral 512A denotes a channel memory device, and numerals 512B and 512C denote selectors. The like signal lines to those shown in FIG. 9 are designated by the like numerals.

When the data is to be written into the register 314, the selector 512C is controlled such that the signal on the signal line 414 or 417 is applied to the read addresses RA1 and RA2 of the channel memory device 512A.

When the data from the incoming highway 401 is to be written into the channel memory device 512A, the selector 512B selects the incoming highway data 405 and the data 406 stored at the corresponding address of the channel memory device 512A by the output signal 407 of the write control circuit 313. In this manner, the block 512 including the channel memory device 512A and the selectors 512B and 512C attains the equivalent function to that of the channel memory 312 of FIG. 9.

As is apparent from the description of the various embodiment, the final stage time switch of the present invention can handle the signals of a multiple of the bearer rate by merely expanding the bit width of the memory and adding the bit-by-bit selective writing function of the channel memory to the prior art time switch. Accordingly, the time division switch is significantly more economical. Further, since the traffic quantity to be handled depends only on the total traffic of the bearer rate signals and does not depend on the traffic ratio of the bearer rate signals, a high flexibility to the traffic variation among the bearer rate signals is attained.

We claim:

1. A time switch comprising:
   memory means including a channel memory for writing bits contained in each time slot of an incoming multiplexed highway into said channel memory according to a fixed address designation corresponding to the time slot of the incoming multiplexed highway and for reading said bits out of said channel memory according to a variable address designation corresponding to a time slot of an outgoing multiplexed highway;
   converter means for covnerting the bits read out of said channel memory to a universal signal, so that a bit stream in the incoming multiplex highway is rate-adapted to a predetermined bit rate of the time slot of the outgoing multiplex highway, in accordance with a conversion mode designation; and
   a control memory for supplying said variable address designation to said memory means and said conversion mode designation to said converter means in synchronism with each other.

2. A time switch according to claim 1 wherein the conversion mode designation for said converter means includes a bit rate class designation and a conversion bit position designation.

3. A time switch according to claim 2 wherein the number of bits of each of the time slots of the incoming multiplexed highway and the outgoing multiplexed highway is 8 and the bit rate class designation is one of 64 Kb/s, 32 Kb/s, 16 Kb/s and 8 Kb/s or any combination thereof.

4. A time switch according to claim 3 wherein when the bit rate class designation is 64 Kb/s, eight input bits to said converter are outputted as they are.

5. A time switch according to claim 3 wherein when the bit rate class designation is 32 Kb/s, eight input bits to said converter means are partitioned to two bit groups each consisting of four bits and are converted so taht each bit of a bit-group designated by the conversion bit position designation is converted to two bits to produce eight output bits.

6. A time switch according to claim 3 wherein the bit rate class designation is 15 Kb/s, eight input bits to said converter means are partitioned to four bit-groups each consisting of two bits and are converted so that each bit of a bit-group designated by the conversion bit position designation is converted to four bits to produce eight output bits.

7. A time switch according to claim 3 wherein the bit rate class designation is 8 Kb/s, eight input bits to said converter means are converted to eight bit-groups each consisting of a specified one of the eight bits in accordance with the conversion bit position designation.

8. A time switch comprising:
   memory means including a channel memory for writing in said channel memory only a selected bit or bits from the bits contained in each time slot of an incoming multiplexed highway in accordance with a variable address designation and a bit position designation corresponding to the time slot of the incoming multiplexed highway and for reading out of the channel memory the bits in accordance with a fixed address designation corresponding to a time slot of an outgoing multiplexed highway;
   a write control circuit for designating a write bit position at which data may be written into said channel memory in accordance with a write mode designation; and a control memory for supplying said variable address designation for said channel memory and said write mode designation for said write control circuit.

9. A time switch according to claim 8 wherein the write mode designation for said write control circuit includes a bit rate class designation and a write bit position designation.

10. A time switch according to claim 9 wherein the number of bits of each of the time slots is 8 and the bit rate class designation is one of 64 Kb/s, 32 Kb/s, 16 Kb/s and 8 Kb/s or a combination thereof.

11. A time switch according to claim 10 wherein when the bit rate class designation is 64 Kb/s, all of eight input bits to said channel memory are written.

12. A time switch according to claim 10 wherein when the bit rate class designation is 32 Kb/s, only four specified bits of eight input bits to said channel memory are written.

13. A time switch according to claim 10 wherein when the bit rate class designation is 16 Kb/s, only two specified bits of eight input bits to said channel memory are written.

14. A time switch according to claim 10 wherein when the bit rate class designation is 8 Kb/s, only one specified bit of eight input bits to said channel memory is written.

15. A time division switch comprising:
a plurality of first stage time switches each including a first channel memory, conversion means, means for writing data signals into said first channel memory in accordance with a fixed address designation corresponding to each time slot on an incoming multiplexed highway and for reading data signals out of said first channel memory in accordance with a variable address designation corresponding to each time slot on an outgoing multiplexed highway to allow multiple distribution of data signals to a plurality of time slots, said conversion means of said first stage time switches converting the multi-distributed data signals to universal signals, so that a bit stream in the incoming multiplex highway is rate-adapted to a predetermined bit rate of the time slot of the outgoing multiplexed highway;
a plurality of final stage time switches each including a second channel memory, write contrl means, and means for writing data signals into said second channel memory in accordance with a variable address designation corresponding to each time slot on an incoming multiplexed highway and for reading data signals out of said second channel memory in accordance with a fixed address designation corresponding to each time slot on an outgoing multiplexed highway, said final stage time switches variably controlling writing to said second channel memory bit by bit by said write control means and converting universal signals at said predetermined bit rate to bearer multiplex signals having the same or a lower bit rate; and
a space switch for exchanging time slots between outgoing multiplexed highways of said first stage time switches and incoming multiplexed highways of said final stage time switches.

16. A time division switch according to claim 15 wherein said first stage time switches each includes:
the first channel memory for writing a data signal from an incoming multiplexed highway by a fixed address designation corresponding to a time slot of the incoming multiplexed highway and reading out the data signal by a variable address designation corresponding to a time slot of an outgoing multiplexed highway;
the conversion means having means for converting the data signal read from said first channel memory to a universal signal in accordance with a conversion mode designation; and
a control memory for supplying the variable address designation for said first channel memory and the conversion mode designation for said conversion means in synchronism to each other.

17. A time division switch according to claim 15 wherein said final stage time switches each include:
the second channel memory for writing a data signal from an incoming multiplexed highway in accordance with a variable address designation corresponding to a time slot of the incoming multiplexed highway at only a bit position synchronously designated and reading out the data signal in accordance with a fixed address designation corresponding to a time slot of an outgoing multiplexed highway;
the write control circuit for designating a write bit position of said second channel memory in accordance with a write mode designation; and
a control memory for supplying the variable address designation for said second channel memory and the write mode designation for said write control circuit.

* * * * *